D. Howarth
Dinner Pail,
Nº 54,817.  Patented May 15, 1866.
Fig: 1.
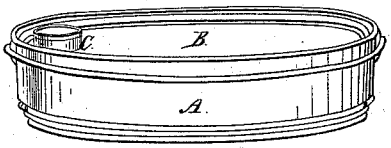
Fig: 2.
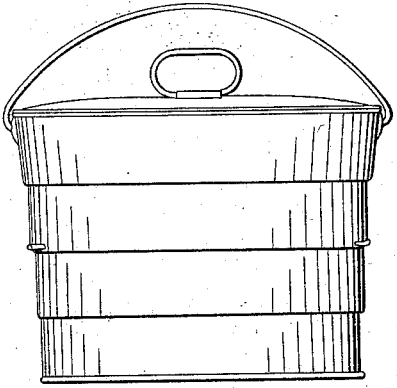
Fig: 3.
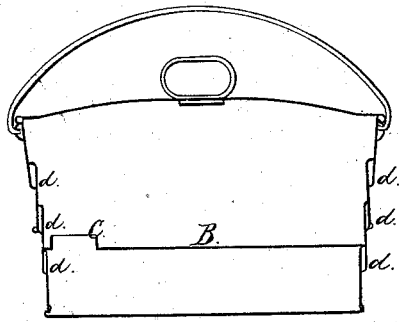
Witnesses;
William H. Clifford,
Sewall C. Strait.
Inventor;
David Howarth.

UNITED STATES PATENT OFFICE.

DAVID HOWARTH, OF PORTLAND, MAINE, ASSIGNOR TO HIMSELF, W. R. JOHNSON, AND SAMUEL C. RUNDLETT, OF SAME PLACE.

IMPROVED DINNER-PAIL.

Specification forming part of Letters Patent No. 54,817, dated May 15, 1866.

*To all whom it may concern:*

Be it known that I, DAVID HOWARTH, of Portland, in the county of Cumberland and State of Maine, have invented a new and useful Dinner-Pail; and I hereby declare the following to be a full, clear, and exact description thereof, which will enable others to make and use my invention, reference being had to the accompanying drawings, forming part of this specification, in which—

Figure 1 shows a view of my invention in perspective and when pressed together; Fig. 2, a side elevation of my invention when prepared for use; Fig. 3, a section showing the different parts and method of securing one to another.

Workmen and laborers whose employment is at a distance from their homes are accustomed to carry their noon meal with them and partake of the same at the place of their labor. Many devices for pails for this purpose have been originated, the aim being a sufficient capacity for the food and drink, and at the same time compactness and convenience. The object of my invention is to produce a pail for this purpose that will contain sufficient food and drink and be capable of being contracted in size when its contents are removed.

My invention consists of a pail constructed of several concentric rings of metal, one fitting within the other, and is so arranged that they may be pressed together, when the outer ring will surround and encompass the others. The rings are of different sizes, the outer ring, which forms the upper part of the pail, being the largest, and then each successive one smaller than the one above it. When the rings are pressed out so as to form the pail, the bottom of one ring hooks on the top of another, being bent for that purpose. In the bottom of the pail and within the lower ring is a compartment for the drink, with a neck for a stopper.

In the accompanying drawings, A shows the rings pressed together, B the top of the compartment for fluids, and c the neck thereof. The cover of the pail is removed.

Fig. 2 shows the pail when prepared for use, the several rings being pressed out. The manner of fastening the several rings together is seen at d, Fig. 3.

I am aware of the use of the concentric rings to form a drinking-cup, but no use of these has been made for the same purpose or in the same combination as in my invention.

Disclaiming all application of this principle except in the subject of my invention,

What I claim, and desire to secure by Letters Patent, is—

A dinner-pail composed of several rings so arranged that they may be pressed out when the pail is to be used, the rings connected with each other when so pressed out by forming hooks or shoulders on their edges to overlap each other, and the lower or bottom ring having a compartment to contain liquid, all constructed and arranged in the manner and for the purposes herein set forth.

DAVID HOWARTH.

Witnesses:
WILLIAM H. CLIFFORD,
GEORGE F. CLIFFORD.